United States Patent [19]

Shepard et al.

[11] Patent Number: 5,031,304
[45] Date of Patent: Jul. 16, 1991

[54] COMPLIANCE-MATCHING ASSEMBLY DEVICE

[75] Inventors: G. Dudley Shepard, Exeter, N.H.; Marc D. Sandefur, Arlington, Mass.

[73] Assignee: The University of Lowell, Lowell, Mass.

[21] Appl. No.: 450,412

[22] Filed: Dec. 14, 1989

[51] Int. Cl.$^5$ .............................................. B23P 19/00
[52] U.S. Cl. ...................................... 29/700; 33/644; 33/832; 901/45
[58] Field of Search .................... 901/45; 29/428, 700; 33/832, 644

[56] References Cited

U.S. PATENT DOCUMENTS

| | | | |
|---|---|---|---|
| 3,984,006 | 10/1976 | Takeyasu et al. | 901/45 X |
| 4,155,169 | 5/1979 | Drake et al. | 901/45 X |
| 4,276,697 | 7/1981 | Drake et al. | 901/45 X |
| 4,316,329 | 2/1982 | Watson | 901/45 X |
| 4,367,591 | 1/1983 | Hirabayashi et al. | 901/45 X |
| 4,439,926 | 4/1984 | Whitney et al. | 901/45 X |
| 4,458,424 | 7/1984 | Cutkosky et al. | 33/183 |
| 4,517,744 | 5/1985 | Consales et al. | 901/45 X |
| 4,702,667 | 10/1987 | Hounsfield et al. | 414/735 |
| 4,720,923 | 1/1988 | Quinton et al. | 901/45 X |
| 4,745,681 | 5/1988 | Hollis, Jr. et al. | 901/45 X |
| 4,848,757 | 7/1989 | De Fazio | 901/45 X |

OTHER PUBLICATIONS

Elmaraghy et al., *An Investigation into the Compliance of SCARA Robots Part I.*, Transactions of the ASME, vol. 110, Mar. 1988, pp. 18–22.

J. Loncaric, *Normal Forms of Stiffness and Compliance Matrices*, The Journal of Robotics and Automation, vol. RA-3, No. 6, Dec. 1987, pp. 567–572.

D. K. Pai et al., *Feasiable Tasks for Manipulators with Uncertainty and Compliance*, IEEE International Conference on System, Man and Cybernetics, 1987, pp. 6–13.

T. Redarce et al., *A Compliant and Electromagetic Table with Partial Levitation for Robotic Assembly*, IFS Advanced Manufacturing Summit: 85, May 1985, pp. 143–151.

D. E. Whitney, *Quasi-Static Assembly of Compliantly Supported Rigid Parts*, Transactions of ASME Journal of Dynamic Systems, Measurement and Control, Mar. 1982, vol. 104, pp. 65–77.

Primary Examiner—Mark Rosenbaum
Assistant Examiner—Frances Chun
Attorney, Agent, or Firm—Hamilton, Brook, Smith & Reynolds

[57] ABSTRACT

A compliant device holding the work-piece part in an assembly, grinding, sanding or polishing process has a rotational compliance which matches the rotational compliance of a compliant device holding the work tool part or part to be assembled with the receiving part. A contact force between the two parts thus causes each part to rotate the same amount about any axis perpendicular to the direction of relative motion between the two compliant devices, thereby preserving the relative orientation of the two parts.

11 Claims, 3 Drawing Sheets

COMPLIANCE-MATCHING ASSEMBLY DEVICE

BACKGROUND

One of the more common tasks in robotic assembly is the insertion of a peg or rod into a hole. Traditionally, this "peg-in-hole" type of assembly has been difficult to implement in the robotics realm. Although the assembly parts are usually beveled to facilitate the assembly process, misalignments can cause the peg to wedge or jam in the hole during insertion. In response to this problem, compliant devices have been designed which respond to the force generated at the point of contact between the misaligned parts. Generally, two types of compliance techniques are used, passive compliance and active compliance. A passively compliant device holding an assembly part is given a degree or several degrees of freedom such that the compliant device will deform in response to the contact force between the assembly parts, in such a way as to reduce the probability of jamming. An actively compliant device holding an assembly part is one which senses the contact force between the assembly parts and responds with active control to change the position of the part it is holding to reduce the contact force and ease the insertion process.

Perhaps the most widely used passively compliant technique is that of a Remote Center Compliance device (RCC). The RCC is constructed such that the transverse component of the assembly force, that is, the force component that is perpendicular to the peg/hole axis, does not cause the peg tip to rotate and therefore to misalign with the hole. In other words, the remote center compliance device being used in a peg-in-hole type assembly, resists the rotational effect of the force on the peg due to contact between the peg and the side of the hole, while allowing lateral movement of the peg relative to the hole. The practical realizations of the remote center compliance device have been based on the assumption that the compliance of the mating parts and/or the supporting jigs, fixtures, robots, grippers, etc. is small compared to that of the remote center compliance device. However, many assembly devices such as multi jointed robot arms have considerable rotational compliance. When this is the case, both the pin tip and the hole individually rotate by differing amounts under the action of the assembly force, thereby increasing angular misalignment and the probability of jamming.

SUMMARY OF THE INVENTION

The invention comprises in general a method and apparatus for facilitating robotic assembly of one part held by a robot to another part mounted on a translationally and rotationally compliant support. The support holds the receiving part of an automatic assembly process which receives a part from an assembly device (a robot) having some known rotational/force compliance characteristic. The rotational compliance characteristic of the compliant support is matched to the rotational compliance characteristic of the inserting device. This matching of compliances ensures that the two assembly parts rotate the same amount about any axis in a plane perpendicular to the assembly axis, as a result of an assembly force generated at a single point of contact between the two assembly parts.

The compliant support is generally a compliant table comprising a rigid plate supported by a plurality of compliant mounts. The table holds a receiving part having a hole into which an inserting part is inserted. The inserting device, generally a robot arm, grasps and holds an inserting part and inserts it in the hole of the receiving part. The inserting part is often a cylindrical peg or rod, in which case the receiving part has a round hole to receive the inserting part. When an assembly force is generated between the two parts due to an offset between the axis of the hole and the axis of the peg, jamming of the peg in the hole is avoided because the receiving part rotates with the inserting peg to preserve the angular alignment of the hole axis with the insertion axis of the peg.

DETAILED DESCRIPTION OF A PREFERRED EMBODIMENT

Figure 1:
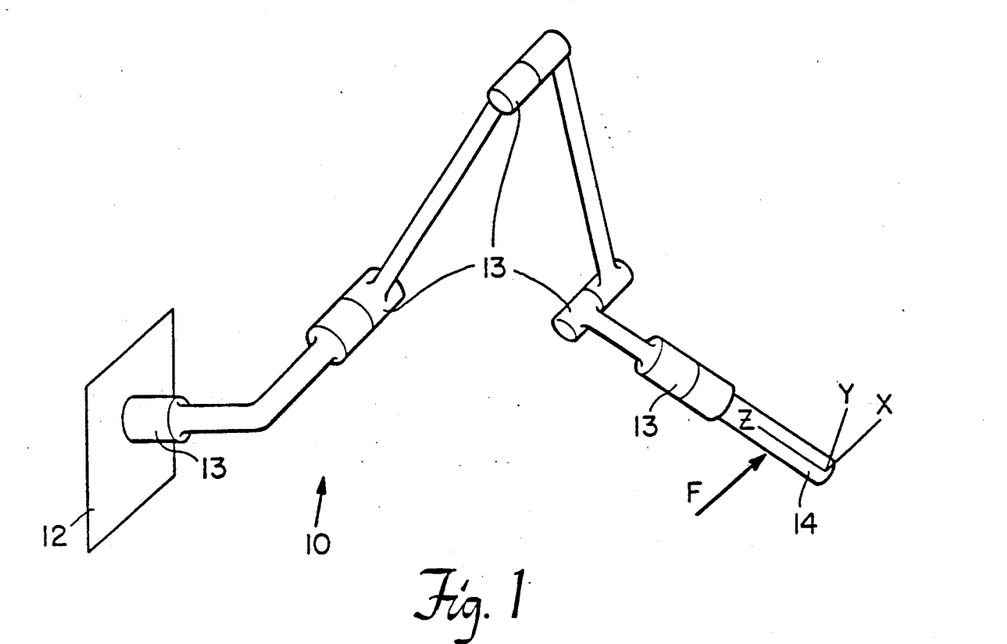
FIG. 1 a multi-jointed robot arm gripping a round peg.

Shown in FIG. 1 is a multi-jointed robot arm generally indicated at 10. The robot arm 10 is an assembly device for performing an automatic assembly process and has a base 12 from which it extends. The robot arm 10 has several sections coupled together by joints 13. In this case the robot arm has a total of five joints, each providing the arm 10 with a different degree of freedom. Gripped at the end of the robot arm 10 is an inserting part, which in this case is peg 14. Peg 14 is held rigidly by the arm 10. In a peg-in-hole type automatic assembly, the peg 14 is directed by the robot arm 10 to a receiving part having a hole in which the peg 14 is inserted.

The robot arm 10 is compliant and moves both translationally and rotationally in response to a force F applied to the peg 14. The robot arm 10 is multi-jointed, and the overall compliance of the arm is a function of the compliance which each of the joints 13 allows to the arm, as well as the compliance of the links which connect the joints. Because the positions of the joints 13 change when the arm 10 is moved, the compliance is also dependent on the position of the arm 10, when a force is applied. A force such as force F applied in the direction of arrow F at the tip of peg 14 causes the peg 14 to both translate and rotate. The overall movement of the peg depends on the magnitude and direction of the applied force, and the compliance of the robot arm 10.

During a robotic assembly process, the robot arm 10 repeats movements according to the instructions provided by a recorded program. For this reason, the robot arm 10 is always in the same position when mating a peg 14 with the hole in a receiving part. The overall compliance of the robot arm 10 is therefore the same each time it inserts a peg in a hole. Determining the compliance of the robot arm 10 when it is in this position provides valuable information about how the peg 14 moves in response to a contact force between the peg and a receiving part.

Figure 2:
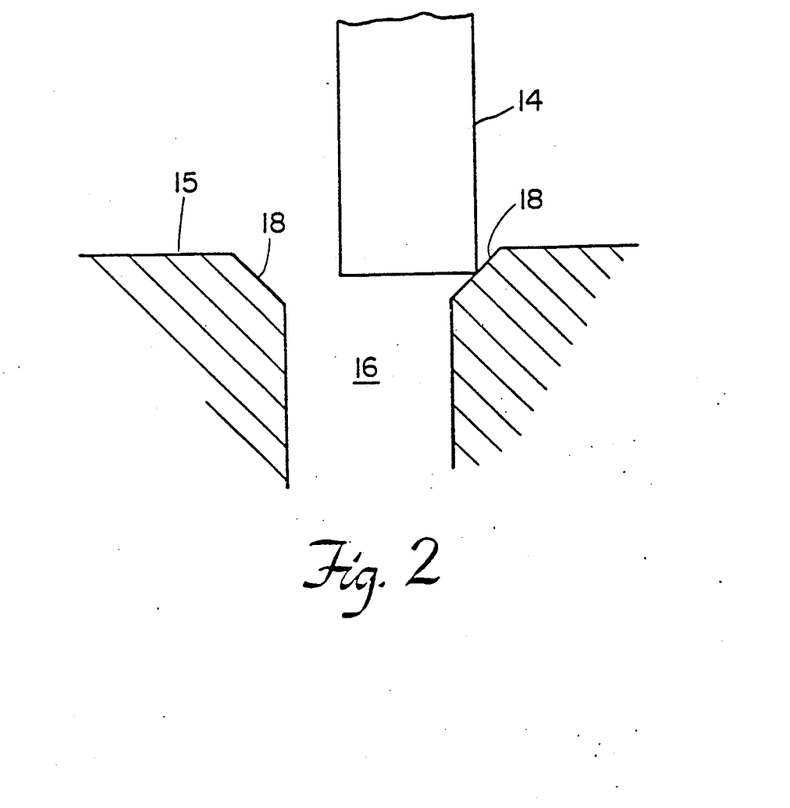
FIG. 2 is an enlarged cross sectional view of a peg with its axis offset relative to the axis of the chamfered hole of a receiving part.

FIG. 2 is an enlarged cross section of a peg 14 and a receiving part 15 having a hole 16 into which the peg 14 is inserted during an automatic assembly process. The edges of the hole are chamfered to ease the insertion of the peg 14. Note: alternatively the peg may be chamfered or both the peg and the hole may be chamfered. In FIG. 2, the insertion axis of peg 14 is not in line with the insertion axis of the hole. This may often occur during a robotic assembly due to part misalignments. When the insertion is first attempted, the peg 14 makes contact with the chamfered portion 18 of the receiving part 15, and there is a resulting force exerted between peg 14 and receiving part 15. Assuming the receiving part 15 is held rigidly compared to the rigidity of the robot arm 10, the contact force causes the peg to rotate. In general, the peg rotation has a component along an axis perpendicular to the insertion axis of the hole 16. Such a rotation is the result of the rotational compliance of the robot arm 10.

Figure 3:
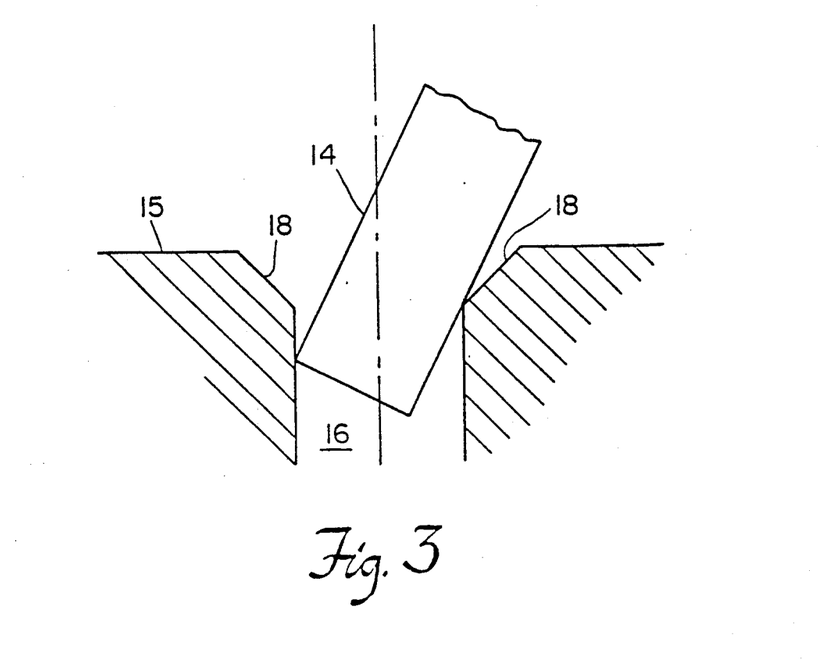
FIG. 3 is an enlarged cross sectional view of a misaligned peg the hole of a receiving part.

As the peg 14 rotates, force from the robot arm 10 causes the point of contact between the two parts to move down the chamfered region 18 of the receiving part 15 until the tip of the peg 14 enters the hole 16. The tip of the peg 14 continues into the hole 16 under the force of the robot arm 10 until it contacts the inner side wall of the hole 16. FIG. 3 shows the peg 14 in this position. In FIG. 3, the axis of peg 14 is no longer parallel to the insertion axis of the hole 16, and continued force from the robot arm 10 can cause the peg 14 to jam in the hole. In such a case the assembly attempt is a failure and the problem must be manually corrected.

In a preferred embodiment of the present invention, the mounting support of the receiving part is constructed, or provided, with a compliance characteristic which allows the receiving part to rotate and translate in response to a contact force between the two assembly parts. To optimize the overall compliance of the system, the compliance characteristic of the robot arm is determined experimentally, and the mounting support is given a rotational compliance characteristic which matches the experimentally deduced rotational compliance of the robot arm. Thus, if a contact force between an offset peg and receiving part causes the peg to rotate a certain amount in a certain direction, the receiving part correspondingly rotates an equal amount in that same direction. In this manner, the insertion axes of both the peg and the hole retain their angular alignment, and jamming under the insertion force of the robot arm is prevented.

Figure 4:
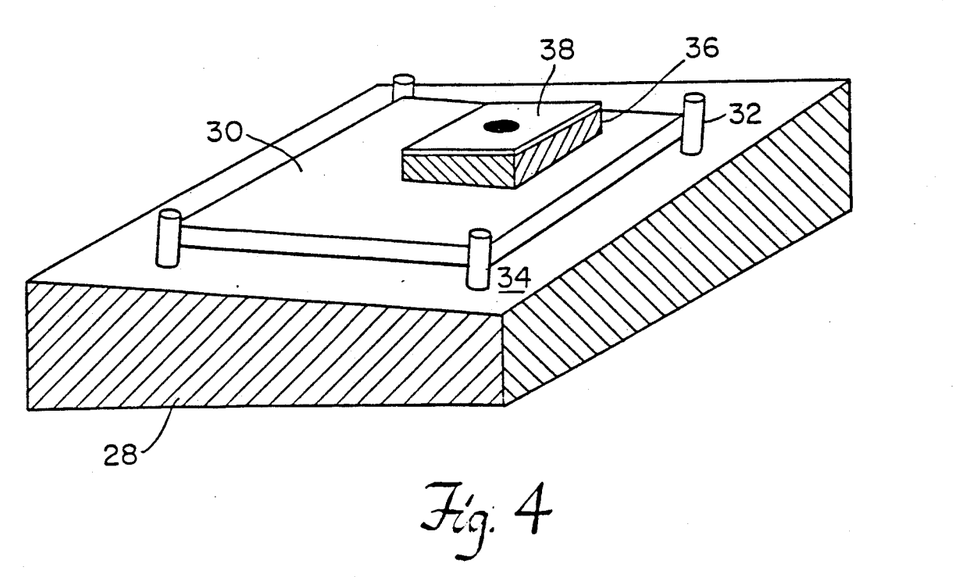
FIG. 4 is a perspective view of a compliant table.

Shown in FIG. 4 is an illustrative depiction of a compliant mounting support in accordance with the present invention. The mounting support 28 is comprised of a rectangular mounting plate 30 which is supported by four elastic springs 32. For simplicity, the four springs 32 are chosen identical in size and stiffness characteristics, and are placed on the mounting plate 30 in a rectangular coplanar configuration. The springs 32 are in turn supported by a base 34 having a flat top plane. As shown in FIG. 4, the flat top plane of base 34 is askew to (not parallel to) the top surface of part 38. The top surface of the base 34 is, however, parallel to the top surface of the plate 30. Mounted on the surface of the plate 30 is an adapter fixture 36 which orients part 38 so that its hole axis is parallel to the insertion axis of a robot arm. Therefore, the overall compliant mounting structure allows for the plane of the mounts 30 to be non-perpendicular to the insertion axis, while it does not alter the angular alignment of the hole axis of the receiving part 38 relative to the pin insertion axis.

Providing the compliant table with the proper compliant characteristics requires knowledge of the compliance of the robot arm so that the compliance of the table may be made to match. The compliance of a three dimensional system may be represented in matrix form. Knowing that, in general, the displacement vector X at a loading point conforms to the relation:

$$X = AF$$

where $\underline{F}$ is the vector representation of an applied force, and $A$ is the compliance matrix at the point at which the force is applied.

The relation may be described by the following equation:

$$\begin{bmatrix} x_1 \\ x_2 \\ x_3 \end{bmatrix} = \begin{bmatrix} a_{11} a_{12} a_{13} \\ a_{21} a_{22} a_{23} \\ a_{31} a_{32} a_{33} \end{bmatrix} \begin{bmatrix} f_1 \\ f_2 \\ f_3 \end{bmatrix} \quad \text{(Eq. 1)}$$

However, since a large number of jamming problems are due to the rotational compliance of the system, the moments produced by an applied force must be considered as well. If the rotation vector $\theta$ is considered along with displacement vector $\underline{X}$, the relation expands into a product of the force and moment vectors with a 6×6 compliance matrix:

$$\begin{bmatrix} x_1 \\ x_2 \\ x_3 \\ --- \\ \theta_1 \\ \theta_2 \\ \theta_3 \end{bmatrix} = \begin{bmatrix} A_{ff} & A_{fm} \\ --- & --- \\ A_{mf} & A_{mm} \end{bmatrix} \begin{bmatrix} f_1 \\ f_2 \\ f_3 \\ --- \\ m_1 \\ m_2 \\ m_3 \end{bmatrix} \quad \text{(Eq. 2)}$$

where $A_{ff}$, $A_{fm}$, $A_{mf}$, and $A_{mm}$ are 3×3 submatrices of the compliance matrix. From this it can be seen that this relation may be rewritten as two vector equations:

$$\underline{X} = A_{ff}\underline{F} + A_{fm}\underline{M} \quad \text{(Eq. 3)}$$

and, $$\underline{\theta} = A_{mf}\underline{F} + A_{mm}\underline{M} \quad \text{(Eq. 4)}$$

Since the present invention directs itself toward matching rotational compliance, the equation for displacement vector $\underline{X}$ may be ignored. Since there are no applied moments in the assembly system during single point contact, the $A_{mm}\underline{M}$ term equals zero, and rotation in response to an applied force $\underline{F}$ is described by the submatrix $A_{mf}$. The $A_{mf}$ matrix provides the information necessary to build a system with a customized rotational compliance.

Expanding the vector relation $\underline{\theta} = A_{mf}\underline{F}$ of the rotationally compliant system gives:

$$\begin{bmatrix} \theta_1 \\ \theta_2 \\ \theta_3 \end{bmatrix} = \begin{bmatrix} a_{44} a_{45} a_{46} \\ a_{54} a_{55} a_{56} \\ a_{64} a_{65} a_{66} \end{bmatrix} \begin{bmatrix} f_1 \\ f_2 \\ f_3 \end{bmatrix} \quad \text{(Eq. 5)}$$

When a force $\underline{F}$ with components $f_1$, $f_2$ and $f_3$ is applied at a point, the system rotates with components $\theta_1$, $\theta_2$, and $\theta_3$. If the axis corresponding to rotation component $\theta_3$ is chosen to represent the insertion axis of the robot arm, then $\theta_3$ represents rotation about that insertion axis. However, since the assembly device inserts a round peg into a round hole, rotation of the assembly parts about the insertion axis has no detrimental effect on the assembly procedure. This degree of angular compliance therefore does not have to be matched. It is only the relative rotational misalignments of the assembly parts about the two transverse axes which cause wedging or jamming during a peg-in-hole type assembly.

For a given force $\underline{F}$, the rotation $\theta_3$ about the insertion axis is governed by the elements $a_{64}$, $a_{65}$, and $a_{66}$ in the third row of matrix $A_{mf}$(Equation 5). Since $\theta_3$ rotations are not critical, the third row of $A_{mf}$ for the robot does not have to be measured nor must this row be matched by the third row of the table $A_{mf}$ matrix. Thus, having the first two rows of the robot compliance matrix provides all the necessary information to build a compliant table with a matching rotational compliance.

The following is a preferred method for fabricating a compliant table which, when a force is applied by a robot arm, rotates an amount in magnitude and direction equal to the rotation of the robot arm.

DESIGN PROCEDURE 1. First, a vector is found which locates a mounting hole of a compliant table with respect to the table s compliance center, by taking the cross product of the first two rows of the $A_{mf}$ matrix of the robot. The magnitude of this vector may be scaled to allow for a suitable sizing of the distance between the hole and the table's compliance center. In this case, the $A_{mm}$ matrix must be scaled in a reciprocal fashion.

If the hole is located away from the compliance center of the table, a moment $\underline{M_c}$ is generated at the compliance center when a force is exerted at the hole. The moment at the compliance center causes the table to rotate. This moment can be mathematically expressed as:

$$M_c = r \times F \quad \text{(Eq. 6)}$$

where $\underline{F}$ is the force vector describing the force of contact at the hole and $\underline{r}$ is a position vector locating the hole with respect to the compliance center of the table.

This may also be rewritten as:

$$M_c = R\ F \quad \text{(Eq. 7)}$$

where $$R = \begin{bmatrix} 0 & -r_z & r_y \\ r_z & 0 & -r_x \\ -r_y & r_x & 0 \end{bmatrix}$$

and $$r = \begin{bmatrix} r_x \\ r_y \\ r_z \end{bmatrix}$$

The table rotation $\theta$ is then given by:

$$\theta = A_{mm} M_c = A_{mm} R\ F \quad \text{(Eq. 8)}$$

2. Next, the rotational compliance to a moment that the table's compliance center must have is determined. (This corresponds to the $A_{mm}$ matrix)

Ignoring the rotational compliance in the z-direction ($\theta_z$).

$$\begin{bmatrix} \theta_x \\ \theta_y \end{bmatrix}_{(at\ peg\ tip)} = \begin{bmatrix} \theta_x \\ \theta_y \end{bmatrix}_{(at\ hole)} \quad \text{(Eq. 9)}$$

Since:

$$\theta_{(at\ peg\ tip)} = A_{mf(at\ peg\ tip)}\ F_{(at\ peg\ tip)}$$

and $$\theta_{(at\ hole)} = A_{mm(at\ c.c.)}\ RF_{(at\ hole)}$$

and $$F_{(at\ peg\ tip)} = -F_{(at\ hole)}$$

therefore:

$$\begin{bmatrix} A^T_{fm1} \\ A^T_{fm2} \end{bmatrix}_{(at\ peg\ tip)} F = - \begin{bmatrix} (R^T A_{mm1})^T \\ (R^T A_{mm2})^T \end{bmatrix}_{(at\ hole)} F \quad \text{(Eq. 10)}$$

where: $A^T_{fmi}$ is the i'th row of the matrix $A_{mf}$, and $(R^T A_{mmi})^T$ is the i'th row of the matrix product $A_{mm}R$. For an arbitrary force $\underline{F}$:

$$\begin{bmatrix} A^T_{fm1} \\ A^T_{fm2} \end{bmatrix} = \begin{bmatrix} (R^T A_{mm1})^T \\ (R^T A_{mm2})^T \end{bmatrix} \quad \text{(Eq. 11)}$$

or $$\begin{bmatrix} A_{fm}(1,i) \\ A_{fm}(2,i) \\ A_{fm}(3,i) \end{bmatrix} = \begin{bmatrix} 0 & -r_z & r_y \\ r_z & 0 & -r_x \\ -r_y & r_x & 0 \end{bmatrix} \begin{bmatrix} A_{mm}(1,i) \\ A_{mm}(2,i) \\ A_{mm}(3,i) \end{bmatrix} \quad \text{(Eq. 12)}$$

for $i = 1,2$

Because the rank of matrix R is two, there are only two independent equations. Performing partitioned matrix multiplication:

$$\begin{matrix} A_{fm}(2,i) \\ A_{fm}(3,i) \end{matrix} = \begin{bmatrix} r_z \\ -r_y \end{bmatrix} \begin{bmatrix} A_{mm}(1,i) \\ A_{mm}(1,i) \end{bmatrix} + \begin{bmatrix} 0 & -r_x \\ r_x & 0 \end{bmatrix} \begin{bmatrix} A_{mm}(2,i) \\ A_{mm}(3,i) \end{bmatrix} \quad \text{(Eq. 13)}$$

or $$\begin{bmatrix} A_{mm}(2,i) \\ A_{mm}(3,i) \end{bmatrix} = \begin{bmatrix} 0 & 1/r_x \\ -1/r_x & 0 \end{bmatrix} \begin{bmatrix} A_{fm}(2,i) - r_z A_{mm}(1,i) \\ A_{fm}(3,i) + r_y A_{mm}(1,i) \end{bmatrix} \quad \text{(Eq. 14)}$$

-continued for i = 1,2

Since there are two equations with three unknown variables ($A_{mm}(1,i)$, $A_{mm}(2,i)$, $A_{mm}(3,i)$), a value for $A_{mm}(1,i)$ is chosen and $A_{mm}(2,i)$ and $A_{mm}(3,i)$ are solved.

The matrix $A_{mm}$ must be symmetrical and positive definite. The symmetry requirement imposes the constraint:

$$A_{mm}(1,2) = A_{mm}(2,1) \quad \text{(Eq. 15)}$$

Therefore, the value of $A_{mm}(1,i)$ when $i=2$ is no longer left to choice but must be equated to $A_{mm}(2,i)$ when $i=1$.

This leaves $A_{mm}(1,i)$, when $i=1$ as a parameter to be chosen. However, this choice of $A_{mm}(1,1)$ must lead to an $A_{mm}$ matrix that is positive definite. This is accomplished by choosing a value for $A_{mm}(1,1)$ that is positive, and results in a positive value for $A_{mm}(2,2)$. In addition, the magnitudes of $A_{mm}(1,1)$ and $A_{mm}(2,2)$ must be large relative to the values of $A_{mm}(1,2)$, $A_{mm}(1,3)$ and $A_{mm}(2,3)$.

The magnitudes of $A_{mm}(1,2)$, $A_{mm}(1,3)$ and $A_{mm}(2,3)$ can be minimized in the least squares sense. Expressing $A_{mm}(1,2)$, $A_{mm}(1,3)$ and $A_{mm}(2,3)$ in terms of $A_{mm}(1,1)$ and then differentiating the sum of the squares of $A_{mm}(1,2)$, $A_{mm}(1,3)$ and $A_{mm}(2,3)$ with respect to $A_{mm}(1,1)$ and equating the resulting expression to zero leads to the following equation:

$$A_{mm}(1,1) = \frac{[r_y(1 + (r_z^2/r_x^2))A_{fm}(3,1) - r_z(A_{fm}(2,1) + r_y A_{fm}(2,2))]}{r_y^2 + r_z^2 + (r_y^2 r_z^2/r_x^2)} \quad \text{(Eq. 16)}$$

Therefore, the first two rows of the $A_{mm}$ matrix at the table's compliance center is found by solving Equation 14 utilizing the value of $A_{mm}(1,1)$ obtained from Equation 16 and incorporating Equation 15. The first two elements of the third row of $A_{mm}$ are determined by the symmetry requirements for $A_{mm}$. Therefore:

$$A_{mm}(3,1) = A_{mm}(1,3) \quad \text{(Eq. 17)}$$

and, $$A_{mm}(3,2) = A_{mm}(2,3) \quad \text{(Eq. 18)}$$

If $r_x$ equals zero or is smaller than $r_y$ and $r_z$ by several orders of magnitude, then Equations 14 and 16 must be reformulated in terms of $A_{mm}(2,2)$. $A_{mm}(3,3)$ must be selected such that the eigenvalues ($\lambda_1$, $\lambda_2$ and $\lambda_3$) of the $A_{mm}$ matrix are related in the following manner:

$$1/\lambda_3 = K_{11}/K_{33}(1/\lambda_1) + K_{22}/K_{33}(1/\lambda_2) +$$

$$+ 4[K_{66} - (K_{11}K_{44})/K_{33} - (K_{22}K_{55})/K_{33})] \quad \text{(Eq. 19)}$$

where $K_{11}$, $K_{22}$, $K_{33}$, $K_{44}$, $K_{55}$ and $K_{66}$ are the principal spring stiffnesses.

Provided the off diagonal elements of $A_{mm}$ are not too large, the eigenvalues of $A_{mm}$ can be made to conform to the above equation by using the recursive procedure described below.

I. Calculate the initial value for $A_{mm}(3,3)$ by substituting $A_{mm}(1,1)$ for $\lambda_1$ and $A_{mm}(2,2)$ for $\lambda_2$ in Equation 19.

II. Find the eigenvalues of the resulting $A_{mm}$ matrix. Check these eigenvalues against Equation 19.

III. If the eigenvalues do not conform to Equation 19, modify $A_{mm}(3,3)$ and repeat step II. Convergence occurs rapidly if a linear interpolation scheme is used to modify $A_{mm}(3,3)$; $A_{mm}(3,3)$ is successively modified to drive the ratio ($\lambda_3$ actual /$\lambda_3$ required) to equal one.

3. Next the orientation of a rectangle formed by the compliance centers of each of the four springs is found. This is accomplished by aligning the two sides of the rectangle with the first two eigenvectors ($\underline{u}_1$ and $\underline{u}_2$) of matrix $A_{mm}$ (the eigenvectors $\underline{u}_1$ and $\underline{u}_2$ correspond to eigenvalues $\lambda_1$ and $\lambda_2$). So if the rectangle is defined as having a first side x and a second side y, then side x is aligned with $\underline{u}_1$ and side y is aligned with $\underline{u}_2$.

$$A_{mm} = u\Lambda u^T \quad \text{(Eq. 20)}$$

where $$\Lambda = \begin{bmatrix} \lambda_1 & 0 & 0 \\ 0 & \lambda_2 & 0 \\ 0 & 0 & \lambda_3 \end{bmatrix}$$

and $$u = [u_1 \quad u_2 \quad u_3]$$

The springs should be positioned such that the principal directions of the springs are aligned with the sides of the rectangle.

4. The dimensions of the rectangle formed by the compliance centers of each of the four springs are now found. These dimensions are obtained by solving the following equations for $S_x$ and $S_y$:

$$1/\lambda_1 = K_{33}S_y^2 + 4K_{44} \quad \text{(Eq. 21)}$$

$$1/\lambda_2 = K_{33}S_x^2 + 4K_{55} \quad \text{(Eq. 22)}$$

where $S_y$ is the length of side Y, and $S_x$ is the length of side X. The effect of changing the dimensions $S_x$ and $S_y$ is to reduce or increase the rotational compliance to a moment as described by the above equations.

Figure 5:
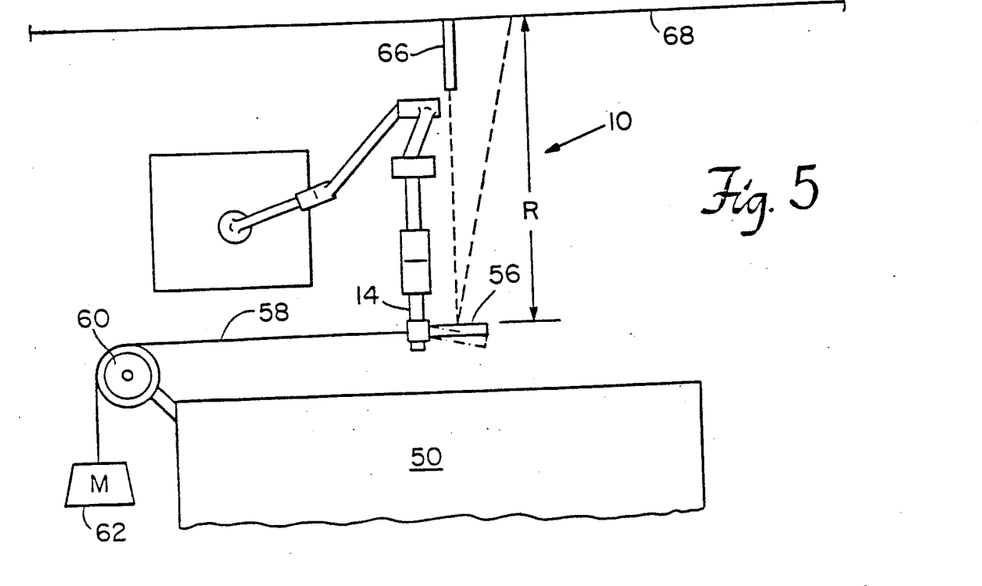
FIG. 5 shows a method for measuring the angular displacement of a compliant robot arm caused by a known force.

One method of measuring the compliance of the robot arm 10 is by applying a known force to the tip of the peg 14 and measuring the resulting rotation of the peg in space. An adaptation of this method is depicted in FIG. 5. With the robot arm 10 in the position that it is ordinarily in during the insertion of a peg in the receiving part, one end of a cord 58 is attached to the tip of peg 14. The cord 58 is looped around a pulley 60 having negligible friction which is attached to the edge of a supporting surface 50. A known mass 62 is attached to the other end of the cord 58 such that the cord pulls on the tip of the peg 14 in the direction of one of three axes of a chosen coordinate system. The resulting rotation of the peg 14 is then measured, and the rotational compliance components of the peg along the axes perpendicular to the peg axis are thereby determined. This measurement is repeated by applying a similar force along each of the other two axes of the chosen coordinate system. With the resulting measurement data, the first two rows of the robot compliance matrix are determined.

The peg rotations can be measured by an optical method, as shown in FIG. 5, using a mirror 56 mounted on the robot arm. The mirror surface is perpendicular to the peg axis, and a laser 66 reflects off mirror 56 to a viewing surface 68 which is perpendicular to the insertion axis. When a force is applied to the peg, the laser beam between the surface of the mirror 56 and the viewing surface 68 undergoes an angular change which causes the laser spot to move on the viewing surface. The magnitude of this angular change is determined by dividing the distance which the laser spot moves on the viewing surface by the distance R between the surface of the mirror 56 and the original location of the laser spot on the viewing surface 68. Since for a light beam reflecting off a flat surface, angle of incidence = angle of reflection the laser beam reflection angle is twice the tilt angle of the first mirror 56. This optical method can also be used to measure the rotations of the compliant table, as described below.

Figure 6:
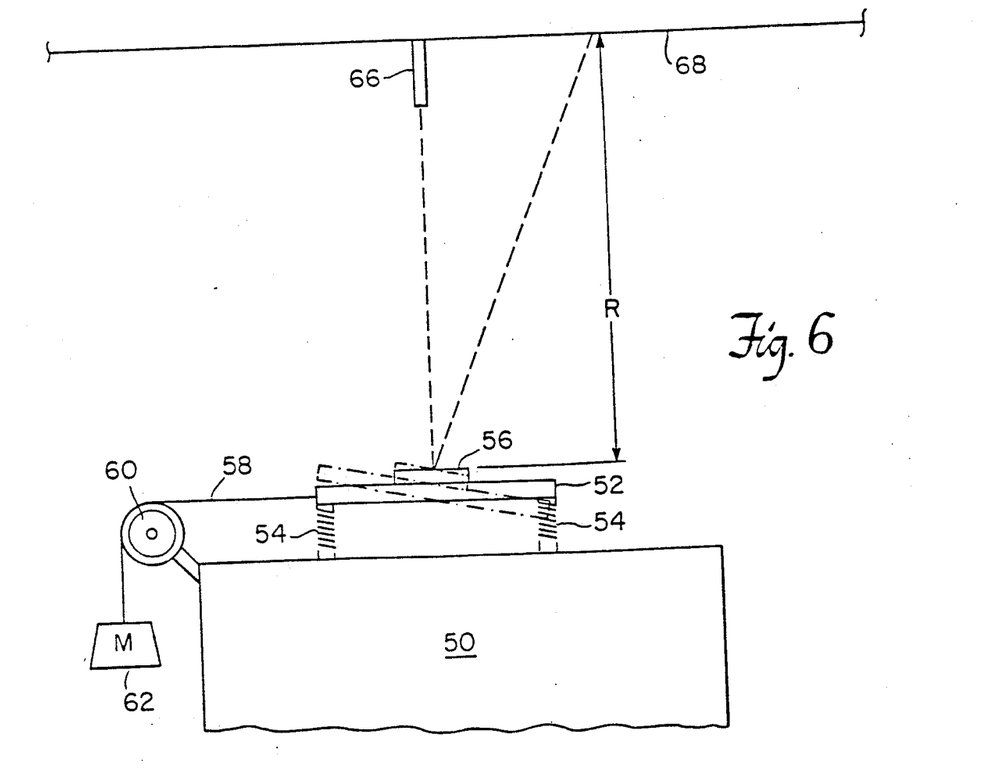
FIG. 6 shows a method for measuring the angular displacement of a compliant table caused by a known force.

The above optical method of measuring the force/rotation compliance of the robot arm can also be applied to the measurement of the force/rotation compliance of a compliant table. Shown in FIG. 6 is a rigid supporting surface 50 on which a compliant table, consisting of rigid plate 52 and four compliant mounts 54, is mounted. A mirror 56 is mounted on table plate 52 so that the mirror surface is perpendicular to the insertion axis. A known force is applied to the compliant table 52 by attaching known mass 62 to the pulley system 58,60. Mounted above the mirror 56 is a laser 66 aligned to the insertion axis. A beam from laser 66 reflects off mirror 56 to a viewing surface 68 which is perpendicular to the insertion axis. Measurements are then made in the same manner as with the robot arm measurement of FIG. 5. Thus, a simple measurement method is provided for measuring the rotation of a compliant table due to an applied force. By changing the force and measuring the movement of the laser spot on the viewing surface 68, the rotational compliances of the table 52 in angular directions perpendicular to the insertion axis are easily determined.

While the invention has been particularly shown and described with reference to a preferred embodiment thereof, it will be understood by those skilled in the art that various changes in form and details may be made therein without departing from the spirit and scope of the invention as defined by the appended claims. Although particularly suited for a peg-in-hole type insertion, those skilled in the art will recognize that the matching compliance techniques of the present invention may be easily adapted to other types of automatic assembly systems as well. In fact, any system which involves the interaction of compliant devices can benefit from the compliance matching taught in the foregoing description to elicit a more controlled response of components to interactive forces. For example, other types of automated systems such as automatic grinding systems, sanding systems, polishing systems or other automatic machining tools can also benefit from a matched compliance system. In such systems, it is desirable to compensate for misalignments between the surface of a work tool such as a grinding, sanding or polishing tool, and the surface of a work-piece to which the tool is delivered along a delivery axis. If a tool and a work-piece are misaligned during operation of the system, uneven wear of the work-piece may occur. By matching the rotational compliances of a compliant device holding the tool and a compliant device holding the work-piece, a moment-generating force developed between the tool and the work-piece causes equal rotation of the tool and work-piece about any axis perpendicular to the delivery axis of the tool. The resulting matched rotations keep the surface of the tool aligned with the surface of the work-piece to produce the most efficient interaction between the tool and the work-piece.

The system is shown in a preferred embodiment as solving for two rows of the force/rotation matrix to match a rotational compliance characteristic. In this embodiment, rotation about the axis of an inserting peg is ignored. However, it will be obvious to those skilled in the art that it could easily be another row of the matrix which is neglected. In addition, the disclosed method can be extended to solve for all three directions of rotation simultaneously without departing from the spirit of the invention. Such an extension results in a more complex mathematical development, but allows for all three directions of rotation to be matched.

We claim:

1. An assembly system comprising:
   a rotationally compliant assembly device for moving a first part relative to a second part, resulting in the assembly of the first part and the second part, said assembly device having a known compliance characteristic; and
   a compliant mounting support for holding said second part, the mounting support having a rotational compliance characteristic relative to the rotational compliance characteristic of said assembly device such that the first part and the second part rotate in a predetermined relative manner in response to contact between the parts during assembly.

2. The assembly system of claim 1 wherein the assembly device is for moving a first part which has a cylindrically shaped portion and the compliant mounting support is for holding a second part which has a hole into which the cylindrically shaped portion of the first part is inserted by the assembly device.

3. The automatic assembly system of claim 1 wherein the assembly device is a robot arm.

4. The automatic assembly device of claim 1 wherein the compliant mounting support is a compliant table.

5. The automatic assembly system of claim 4 wherein the rotational compliance of the compliant table is provided by a plurality of compliant mounts by which the surface of the table is supported.

6. The assembly system of claim 1 wherein the mounting support is for holding a second part which has a cylindrically shaped portion and the assembly device is for moving a first part which has a hole to receive the cylindrically shaped portion of the second part as the first part is moved relative to the second part by the assembly device.

7. An automatic assembly system comprising:
   a rotationally compliant assembly device for moving a first part relative to a second part along an assembly axis, resulting in the assembly of the first part and the second part, the assembly device having a known compliance characteristic; and
   a passive rotationally compliant mounting support holding the second part, the mounting support having a rotational compliance characteristic which matches the rotational compliance characteristic of the assembly device such that the first part and the second part rotate the same amount about any axis in a plane perpendicular to the assembly axis as a result of an assembly force generated at a point of contact between the first part and the second part.

8. The assembly system of Claim 7 wherein said assembly device is for moving a first part which is a male part and the mounting support holds a second part which is a female part.

9. The automatic assembly system of Claim 7 wherein the mounting support comprises a compliant table the surface of which is supported by a plurality of compliant supports.

10. The automatic assembly system of Claim 7 wherein the assembly device is a robot arm.

11. A compliant system comprising:

an assembly device having a known rotational compliance characteristic; and a passive, rotationally compliant mounting support for holding a receiving part, the receiving part receiving an assembly part from the assembly device, a rotational compliance characteristic of the mounting support being related to the rotational compliance characteristic of the assembly device such that the receiving part and the assembly part rotated in a predetermined relative manner about any axis in a plane perpendicular to an assembly axis as a result of an assembly force generated at a single point of contact between the assembly part and the receiving part, said rotating facilitating the assembly of the assembly part and the receiving part.

* * * * *

UNITED STATES PATENT AND TRADEMARK OFFICE
CERTIFICATE OF CORRECTION

PATENT NO. : 5,031,304
DATED : July 16, 1991
INVENTOR(S) : G. Dudley Shepard and Marc D. Sandefur It is certified that error appears in the above-identified patent and that said Letters Patent is hereby corrected as shown below:

Col. 12, line 10, delete "rotated" and insert ---rotate---.

Signed and Sealed this

Thirty-first Day of August, 1993

Attest:

BRUCE LEHMAN

Attesting Officer   Commissioner of Patents and Trademarks